United States Patent
Petigk et al.

(10) Patent No.: US 10,901,160 B2
(45) Date of Patent: Jan. 26, 2021

(54) MULTIPLEXER OR DEMULTIPLEXER MODULE

(71) Applicant: HUBER+SUHNER Cube Optics AG, Mainz (DE)

(72) Inventors: Thomas Petigk, Rüsselsheim (DE); Ingo Smaglinski, Mainz (DE)

(73) Assignee: HUBER+SUHNER Cube Optics AG, Mainz (DE)

( * ) Notice: Subject to any disclaimer, the term of this patent is extended or adjusted under 35 U.S.C. 154(b) by 0 days.

(21) Appl. No.: 16/361,500

(22) Filed: Mar. 22, 2019

(65) Prior Publication Data

US 2019/0293879 A1 Sep. 26, 2019

(30) Foreign Application Priority Data

Mar. 23, 2018 (DE) .................. 10 2018 107 029

(51) Int. Cl.
  *G02B 6/42* (2006.01)
  *G02B 6/293* (2006.01)
  (Continued)

(52) U.S. Cl.
  CPC ......... *G02B 6/4215* (2013.01); *G02B 6/2938* (2013.01); *G02B 6/423* (2013.01);
  (Continued)

(58) Field of Classification Search
  CPC .. G02B 6/4215; G02B 6/2938; G02B 6/4239; G02B 6/423; G02B 6/29307;
  (Continued)

(56) References Cited

U.S. PATENT DOCUMENTS 6,832,031 B2   12/2004  Smaglinski
6,985,658 B2   1/2006   Smaglinski
(Continued)

FOREIGN PATENT DOCUMENTS

DE       100 43 985 A1     3/2002
DE   10 2005 040 731 A1    5/2006
(Continued)

OTHER PUBLICATIONS

German Search Report dated Feb. 6, 2019, issued in corresponding German Patent Application No. 10 2018 107 029.2.

*Primary Examiner* — John Bedtelyon
(74) *Attorney, Agent, or Firm* — Morgan, Lewis & Bockius LLP (57) ABSTRACT

Multiplexer or demultiplexer module has a carrier plate with at least one wavelength-selective element, at least two focussing elements, a waveguide, preferably a fibre optic cable, for the transmission of an optical signal, which has a signal output or input for coupling the optical signal in or out and collimation optics, which are arranged between signal output and a first wavelength-selective element. In a demultiplexer module, forces transmitted via the waveguide to the demultiplexer module are diverted such that passive adjustment of the optical elements is hardly influenced. The demultiplexer module is connected to a detector plate, can be adjusted with respect to detectors located on a detector plate, and has a high thermal tolerance. The carrier plate has a stop for the waveguide preferably configured integrally with the carrier plate, wherein the waveguide or a coating surrounding the waveguide rests on or is fastened, preferably adhered to the stop.

22 Claims, 6 Drawing Sheets

(51) Int. Cl.
*H04B 10/572* (2013.01)
*H04J 14/02* (2006.01)

(52) U.S. Cl.
CPC ......... *G02B 6/4239* (2013.01); *H04B 10/572* (2013.01); *H04J 14/0227* (2013.01)

(58) Field of Classification Search
CPC .... G02B 6/424; G02B 6/4214; H04B 10/572; H04J 14/0227
See application file for complete search history.

(56) References Cited

U.S. PATENT DOCUMENTS

| | | | |
|---|---|---|---|
| 7,443,069 B2 | 10/2008 | Chen et al. | |
| 8,977,080 B2 | 3/2015 | Smaglinski et al. | |
| 9,864,145 B2 | 1/2018 | Dannenberg et al. | |
| 9,910,233 B2 * | 3/2018 | Tamura | G02B 6/4214 |

FOREIGN PATENT DOCUMENTS

| | | |
|---|---|---|
| DE | 10 2005 010 557 A1 | 9/2006 |
| DE | 10 2008 042 719 A1 | 4/2010 |
| WO | 2006/092444 A1 | 9/2006 |

\* cited by examiner

MULTIPLEXER OR DEMULTIPLEXER MODULE

The present invention relates to an optical multiplexer or demultiplexer module, which, with the exception of the transmitting or receiving elements, has all components required for a multiplexer or demultiplexer. The module is configured such that it can be connected stably and in a simple manner to a suitable plate comprising transmitting and receiving elements (transmitter plate or detector plate).

Generally, diodes or lasers are used as transmitting elements and photodetectors as receiving elements (detectors). The terms "transmitting or receiving elements" are, however, not limited to this selection and also comprise other optical elements such as grating couplers and prisms.

The so-called multiplex method is a method for the common transmission of a plurality of independent signals (primary signals) via a single transmission medium. In a multiplexer, the different independent signals are combined into a single multiplexer signal. Subsequently, the multiplex signal is transmitted along a signal conductor and on the receiving side is deconstructed in a demultiplexer back into the different independent signals.

In the case of so-called frequency multiplex methods, a plurality of frequency bands, which are adjacent, but spaced apart from one another, are provided to which a determined carrier frequency and bandwidth are assigned in each case. The carrier frequencies of a frequency band are modulated with primary signals, wherein a carrier frequency is assigned to a primary signal. The modulated signals resulting therefrom can then be transmitted together and independently as a broadband multiplex signal. On the receiving side, the multiplex signal can then be divided by using filters back into the signals of the different frequency bands. The modulated signals contained in the frequency bands are subsequently demodulated, whereby the originally transmitted signal is obtained.

In the case of transmissions of signals to optical waveguides, an optical frequency multiplex method is generally used, which is also designated as wavelength multiplex method. In the case of this method, light signals with different carrier frequencies are used as carrier signals for the transmission. In this case, each carrier frequency used provides its own transmission channel on which the signals to actually be transmitted (primary signals or also data signals) can be modulated (amplitude modulation). The data signals modulated in this manner are then bundled by means of corresponding optical coupling elements and transmit simultaneously, but independently of one another. At the receiver of this optical multiplex connection, the individual optical transmission channels are separated again in a demultiplexer with the aid of corresponding wavelength-selective elements e.g. passive optical filters. Subsequently, the optical signals can be converted with corresponding receiving elements into electric signals.

A further optical multiplex method is the polarisation multiplex method. This can also be used for bundled transmission of light signals. Only the wavelength multiplex method is for the most part used below to describe the present invention for reasons of simplicity. However, the present invention is not limited to this and can be similarly applied to other multiplex methods such as for example the polarisation multiplex method.

Optical multiplexers and demultiplexers have been known for a long time. A multiplexer can essentially also be used as a demultiplexer by reversing the beam path and vice versa. In this case, transmitters such as for example lasers and diodes, which generate the corresponding light signals to be transmitted, merely have to be used instead of detectors, which convert the received transmitted optical signals into electric signals.

The description explicitly refers below to demultiplexers. It is understood, however, that the described features can also be advantageously used with multiplexers, wherein the beam direction is then simply reversed.

Demultiplexers generally have an input connection or a signal output of a waveguide for the coupling of an optical signal, which has the signal components of different wavelengths, at least one wavelength-selective element and at least two focussing elements, wherein the wavelength-selective element and the focussing elements are arranged such that at least one part of an optical signal coupled in via the input connection firstly impinges upon the wavelength-selective element and then upon a focussing element and an additional part firstly impinges upon the wavelength-selective element and subsequently upon another focussing element.

A wavelength-selective element is understood as any element which, placed in the beam path, influences one or a plurality of wavelength channels or polarisation channels, wherein at least one wavelength or polarisation channel is influenced in another manner or with a different strength than an additional wavelength or polarisation channel. Influencing is understood for example as reflecting, absorbing, amplifying, attenuating, interrupting or polarising. The term "wavelength-selective" includes, in the sense of the present invention, for reasons of simplicity, the term "polarisation-selective". A polarisation filter in this sense also constitutes a wavelength-selective element.

A focussing element is understood as any element capable of bundling incident parallel light beams substantially in one point, the so-called focus or focal point. Optical lens or concave mirrors can for example be used as focussing elements. Focussing elements work, when the beam direction is reversed, as collimators. A collimator is understood as any element capable of converting an incident bundle of divergent light beams into a bundle of parallel light beams.

In the simplest case, the demultiplexer has only one wavelength-selective element and two focussing elements. An input signal, which consists of two separate frequency components (frequency channels), is then directed to the wavelength-selective element, which reflects one frequency component and can transmit the other one. The focussing elements are in this case arranged such that one receives the transmitting beam and the other receives the reflecting beam and bundles them in the respective focal point. If a suitable beam detector, e.g. a photodiode, is arranged at the corresponding focal points, then the amplitude, i.e. the beam intensity of the frequency signal, can thus be measured electrically.

In general, a demultiplexer has a plurality of wavelength-selective elements to which the signal is consecutively directed along the beam path, wherein each wavelength-selective element separates a wavelength channel from the rest of the signal. The arrangement of a plurality of wavelength-selective elements in consecutive sequence in the beam path is also designated as a filter cascade.

The manufacture of demultiplexers is, however, very complex. This is, amongst other things, due to the required adjustment of the optical elements. The signal combined on the corresponding transmission medium e.g. an optical fibre must be deflected with the aid of a precisely adjusted arrangement of filters and mirrors on corresponding detector elements in order to cause an effective splitting of the signal into its individual channel components. In this case, it must also be ensured that the functionality of the demultiplexer must often be ensured in a wide temperature range of approx. −40° C. to 85° C., so that external environmental influences or operational-side temperature changes do not lead to constraints on functionality. The temperature range, in which unrestricted functionality is ensured, is designated as a thermal tolerance range of the demultiplexer.

A demultiplexer is for example known from DE 10 2008 042 719 A1, which enables a so-called passive adjustment of the optical elements. It has a carrier plate with at least one wavelength-selective element, a focussing member with at least two focussing elements and a detector plate, wherein both the carrier plate and also the focussing member are connected to the detector plate. In addition, DE 10 2008 042 719 A1 shows that the focussing member can have a fibre stop and the fibre optic cable can be fastened to this fibre stop such that the forces acting on the fibre optic cable are diverted via the focussing member.

Due to increasing popularity and more intensive use of fibre optic cables, the requirements placed on demultiplexers or multiplexers with respect to their tolerance to thermal fluctuations are also increasing. The thermal tolerance range of a demultiplexer therefore plays an important role and can represent a limiting factor for the use of the demultiplexer.

Furthermore, the demands on the simplicity of demultiplexers and multiplexers also increase with the popularity of fibre optic technology. For example, detector plates of the type often used are manufactured independently of the other components of a demultiplexer, which is why it has been found to be desirable for detector plates to be manufactured on the one hand, and a suitable module, which consists of the entirety of the remaining components of a demultiplexer, to be manufactured on the other hand, which result in a complete demultiplexer when put together. In this case, its stability, i.e. resistance to external forces attacking the demultiplexer module, should be at least as high as that of a demultiplexer not composed in a modular manner.

The known demultiplexer systems, however, allow neither a stable modular structure nor a simple connection of a detector plate to the entirety of the remaining components of a demultiplexer. In particular the required stability of a demultiplexer to forces (such as e.g. pulling forces), which are transmitted via the waveguide to the components of the demultiplexer, cannot, in the case of a modular structure, be ensured with the solutions known from the prior art.

The objects of the present invention are to provide a demultiplexer module, which is firstly characterised in that forces transmitted via the waveguide to the demultiplexer module can be diverted such that the passive adjustment of the optical elements is hardly influenced, which is secondly connected to a detector plate in a simple manner and can be adjusted with respect to detectors located on a detector plate and thirdly has a high thermal tolerance.

According to the invention, at least one of these objects is achieved by a multiplexer or demultiplexer module with the features of Claim 1.

The demultiplexer module according to the invention consists of a carrier plate with at least one wavelength-selective element, at least two focussing elements and a waveguide, which is preferably a fibre optic cable and collimation optics (a collimator). The waveguide has, in this case, a signal output, which is generally configured in the form of a fibre optic cable end with an end face cross-sectional area for coupling an optical signal into the demultiplexer module. The collimation optics is, in this case, arranged between the signal output and the first wavelength-selective element such that an optical signal, which leaves the signal output, firstly impinges upon the collimation optics.

According to the invention, the carrier plate has a stop (fibre stop) preferably configured integrally with the carrier plate on which the waveguide for adjusting the signal output rests or to which it is fastened, preferably adhered. The waveguide itself can alternatively also be surrounded by a coating, which rests on or is fastened to the stop. The coating can for example be part of a ferrule interface. In such a case, the waveguide is not fastened directly to the stop, but rather the coating surrounding the waveguide is fastened to the stop.

In this connection, integral is understood as a configuration in one piece and from the same material. Stop elements, which are connected to the carrier plate in a materially-bonded manner for example by means of adhering, soldering or welding, are not configured integrally in the sense of the present invention.

Through this special arrangement, a stable demultiplexer module is provided, which can be connected to a detector plate. A detector plate is preferably a circuit board with integrated detectors, which can for example be configured as photodiodes. Increased stability of the demultiplexer module and accordingly also the demultiplexer can be advantageously achieved by fixing the waveguide on the carrier plate since the forces acting on the fibre optic cable are diverted to the carrier plate, wherein the carrier plate generally has the highest stability among the components of a demultiplexer module. A change to the pre-adjusted arrangement of the optical elements of a demultiplexer caused by forces attacking the waveguide is made notably more difficult as a result. Earlier solutions, such as described in DE 10 2008 042 719 A1, for example, in the case of which these forces were diverted to a focussing member, in contrast have a notably lower resistance to external force effects when a demultiplexer consists of a detector plate, on the one hand, and a module comprising the remaining components on the other hand. A diversion of the forces acting on the fibre optic cable to the focussing member is therefore unsuitable in particular in order to enable a modular structure consisting of a detector plate on the one hand and a demultiplexer module on the other hand. Due to the relevant configuration, adjustment of the stop relative to the carrier plate is not necessary.

In a preferred embodiment, a focussing member is provided which has the at least two focussing elements. The focussing elements can for example be configured as lenses or curved reflecting surfaces. The advantage of a focussing member is that the adjustment of the focussing elements in relation to one another is designed particularly simply as a result.

The present invention, however, also comprises alternative embodiments. For example, a part of the beam path separated from the original beam path (multiplex signal) by a wavelength-selective element firstly impinges upon an additional reflecting, but not focussing element, which deflects the signal in the direction of a detector. The focussing of the beam bundle associated with the signal can, in this case, be carried out through a lens, which is located between the detector and the additional reflecting element.

In a preferred embodiment, the fibre stop is configured as a groove and the waveguide or a coating surrounding the waveguide is arranged in the groove. In this case, the profile of the groove preferably has a V shape or U shape. Such a groove fixes a waveguide or a fibre optic cable in relation to two different spatial directions. This makes it particularly simple when assembling the demultiplexer module to produce precise fixing and adjustment of the waveguide and therefore also the signal output. The waveguide is only laid into the groove and, if necessary, adhered there. Therefore, a groove as the fibre stop enables a precise and also cost-effective adjustment of the signal output. V-shaped and U-shaped grooves have been proven to be particularly advantageous in relation to the adjustment of the signal output since they can ensure the even distribution of an adhesive used for fixing such that during manufacture differences between structurally-identical demultiplexers are avoided to a large extent in relation to the fixing and adjustment of the waveguide.

The groove of a further embodiment can also have two groove sections, which differ in relation to the groove cross-section (groove profile). A first groove section is, in this case, configured as a stop and a second groove section preferably has a larger cross-sectional area than the first groove section. In particular, the end face of the fibre optic cable, i.e. the signal output can be arranged in the first groove section. Another part of the fibre optic cable can, in contrast, be arranged in the second groove section. The fastening or adhesion of the fibre optic cable with the groove most suitably takes place in the second groove section, which provides space for receiving the adhesive due to its larger cross-section. The arrangement of the end face of the fibre optic cable in the first groove section then allows precise adjustment of the end face of the fibre optic cable without there being the danger that the position of the end face of the fibre optic cable changes again due to adding the adhesive.

In a further preferred embodiment, the carrier plate has two support surfaces arranged parallel to one another, wherein the at least one wavelength-selective element is arranged on one support surface and an additional wavelength-selective element or a reflecting element is arranged on the other support surface. For example, the carrier plate can be a glass plate, which can be easily manufactured with support surfaces arranged parallel to one another. For the assembly of the module, the corresponding elements can then simply be placed on the support surfaces and are then aligned parallel to one another. The beam path then runs through the carrier plate. The carrier plate must in this case be made of a material transparent for the optical signals.

A through-opening is preferably provided in the carrier plate, which connects the support surfaces. The beam path can then take place through the through-opening such that the carrier plate does not necessarily have to be manufactured from a transparent material. The reflecting elements and/or the wavelength-selective elements can then be placed on the opposing support surface of the carrier plate such they at least partially cover the through-opening. The beam path of a filter cascade can be enabled through such an arrangement of the reflecting and/or wavelength-selective elements on a carrier plate by a particularly simple construction.

The beam path of the filter cascade can in this case be arranged inside the outlet opening and an individual focussing member arranged opposite one side of the through-opening. In this case, wavelength-selective elements are located on one support surface, on the side facing the focussing member, and reflecting elements on the other support surface. Alternatively, one focussing member can in each case also be arranged for example opposite the two sides of the outlet opening, wherein only one of the two focussing members needs to have collimation optics in this case. In this case, wavelength-selective elements are arranged on both support surfaces. The latter alternative is in particular advantageous if a multiplex signal consisting of a number of wavelength channels is supposed to be split up in a demultiplexer module that is as small as possible on many or all of these wavelength channels. For example, an 8-channel module with a single focussing member has a similar spatial elongation as a corresponding 16-channel module with two focussing members.

In the case of a particularly preferred embodiment, the carrier plate has a preferably V-shaped or U-shaped adhesive stop groove which is configured such that one end of the outlet opening is arranged inside the groove. Corresponding adhesive stop grooves are best arranged in both support surfaces. Using the adhesive stop grooves, the signal output can be easily arranged at a certain distance from the adhesive site at which the waveguide is fastened to the stop of the carrier plate by means of adhesive. As a result, adhesive is prevented from running along the waveguide to the signal output directly after application owing to the viscosity and surface tension of the adhesive.

In a further embodiment, the stop is arranged on an outer wall of the carrier plate. The outer wall is easily accessible, whereby a stop or a groove can be worked into the outer wall cost-effectively and using simple means. In addition, using such an arrangement, the optical elements, which are arranged on the carrier plate, and the stop are arranged spaced apart from one another, whereby mutual contact of optical elements and waveguides and any adjustment of the demultiplexer module possibly caused as a result is prevented during assembly and during operation.

In a further preferred embodiment, the stop provided for the fastening of the waveguide is arranged on an inner wall of the outlet opening. The outlet opening, on the one hand, already provides a space in which a part of the beam path of a demultiplexer, in particular the beam path of a filter cascade can spread. On the other hand, the outlet opening, in the case of the embodiment discussed here, also enables a fixing and adjustment of the waveguide or the signal output by the side wall of the outlet opening being configured as a stop in general or as a groove specifically. Therefore, a clever formation of the outlet opening ensures that both a suitable space for one part of the beam path and also a stop is provided with a minimal requirement of elements and material. The outlet opening therefore assumes a dual function in this sense.

In a further embodiment, the at least one focussing member is configured as a moulded part and the collimation optics consists of a curved reflecting surface. It is preferably configured integrally with the moulded part. The moulded part is generally manufactured from plastic. The curved reflecting surface can for example be configured in such a manner, as described in DE 100 43 985, the content of which is incorporated into this application by reference. The moulded part can in principle be configured, as described in DE 10 2005 010 557, the content of which is incorporated into this application by reference.

In addition, the moulded part and the carrier plate are connected to one another by a connection element. In this case, the connection element has at least two spring elements, which in each case have an anisotropic elasticity. The spring elements are configured such that they have an elasticity direction in which the spring elements have a comparably low spring constant. In other words, the spring elements in each case have, in directions perpendicular to one another in each case, spring constants at least twice as large as in the third spatial direction perpendicular to the first two directions, of the mentioned elasticity direction. At best, the spring constant is, however, in the two directions perpendicular to the elasticity direction, many times greater, for example fifty times greater than in the elasticity direction. The elasticity directions of the two spring elements do not run parallel to one another and span a first elasticity plane. Essentially, connection elements can be used, as they are for example described and shown in DE 10 2005 040 731, the content of which is hereby incorporated into this application.

Using the described connection elements means that at least the angular accuracy of the carrier plate in relation to the focussing member remains relatively high in the case of larger temperature changes. In this case, each spring element serves, on the one hand, to allow to a limited extent the movement of the focussing member with respect to the carrier plate, in particular in the case of a temperature change and associated volume changes of the components, in one direction, the so-called elasticity direction, while a corresponding relative movement in the other directions running roughly perpendicular thereto is prevented as far as possible.

In a further embodiment building on the previously described embodiment, the at least two focussing elements are configured as curved reflecting surfaces. These focussing elements and the collimation optics are also arranged along a longitudinal axis.

The spring elements of the connection elements, which, on the one hand, are fastened to the carrier plate, also have contact surfaces on which the moulded part is fastened. The positions of the moulded part, at which the moulded part is connected to these contact surfaces, determine the point of the moulded part, which is not displaced in the case of a volume change of the moulded part with respect to the carrier plate. This point is called the pivot point or fixed point. A volume change of the moulded part therefore takes place proceeding from this fixed point. Since such a point at a fixed location inside the moulded part exists, the spring elements must be arranged such that imaginary straight lines, which extend proceeding from the middle points of the contact surfaces along the respective elasticity directions, intersect in a cutting point, which is inside the moulded part. This cutting point is then the fixed point. This point can for example, through corresponding arrangement of the spring elements, be placed at the point of an optical element, the functioning mode of which is particularly prone to displacements. For example, the collimation optics could be positioned in the fixed point.

In a particularly preferred embodiment, the spring elements are arranged and configured such that the fixed point is located in relation to the longitudinal axis of the moulded part between the position of the collimation optics and the middle of a section of the longitudinal axis, which is delimited by the collimation optics and the focussing elements spaced furthest apart from the collimation optics.

It has been shown that the positioning of the fixed point in the above-described region of the longitudinal axis of the moulded part results in the light beams leaving the demultiplexer module via the focussing elements in the case of temperature changes impinging upon detectors, which are arranged opposite the focussing elements, at smaller distances to the middle points of the detectors than in the case of other positions of the fixed point.

In general, a temperature changes leads to a volume change of the components of a demultiplexer. The size of the volume change depends on the thermal expansion coefficients of the components. In particular if the components have different thermal expansion coefficients, temperature changes, as a result, lead to relative position and distance changes inside a demultiplexer. In general, in the case of heating, a focussing member configured as a moulded part expands to a greater extent than a detector plate or a carrier plate. Therefore, a temperature change leads to a displacement of the focussing elements with respect to the detectors. The focal points of the focussing elements are often displaced to the same degree with respect to the detectors. Since the thermal expansion coefficients of carrier plate and detector plate are frequently close to one another, the moulded part is displaced in the case of temperature changes generally to a comparable degree with respect to the detector plate as with respect to the carrier plate.

The positioning of the fixed point according to the invention allows the negative effect, which is caused by the thermal expansion of the elements, to be minimised.

In principle, the carrier plate including the focussing member fastened to it via the connection element can, for its part, be connected to a detector plate via a corresponding connection element.

In a preferred embodiment however, the same connection element is used in order to fasten both the focussing member to the carrier plate and the carrier plate to the detector plate.

In a preferred embodiment, the connection element therefore has a base part connected to the carrier plate. The base part itself, in turn, has a ground element on which the first spring element is fastened, and a first limb element on which the second spring element is fastened. The first limb element also has a fastening element for fastening the carrier plate to a transmitter or detector plate. A second limb element fastened to the ground element is preferably provided, which also has a fastening element for fastening the carrier plate to a transmitter or detector plate and can optionally also have a further spring element for connecting carrier plate and moulded part.

The connection element therefore advantageously provides an interface between demultiplexer module and detector plate. All components of the demultiplexer module can therefore be connected to a detector plate via the limb elements of the connection element. Further interfaces, such as for example interfaces between focussing member and detector plate, are therefore not necessary.

In a further embodiment, a first and a second limb element are provided, which are configured as fastening spring elements, which in each case, have spring constants at least twice as great in two spatial directions perpendicular to one another than in the third spatial direction perpendicular to the two first spatial directions, of the so-called elasticity direction. The elasticity direction of the first fastening spring element and the elasticity direction of the second fastening spring element do not run parallel to one another and determine a second elasticity plane, which is preferably arranged at right angles to the first elasticity plane.

The design of the limb elements as spring elements, as so-called fastening spring elements, allows an anisotropic elastic mounting of the carrier plate and all parts connected to it with respect to the detector plate. As a result, high angular accuracy can be ensured in the case of the alignment of the demultiplexer module with respect to the detector plate. Therefore, carrier plate, focussing member and detector plate, which in each case have different thermal expansion coefficients, can be mounted and adjusted elastically against one another such that a high accuracy of the positioning of the different components can be ensured and bends of the respective components caused by temperature changes can be minimised. A rectangular arrangement of the first and second elasticity plane has been found to be particularly advantageous for the compactness of the demultiplexer module.

The connection element can in principle be configured integrally. Furthermore, the connection element and in particular the fastening spring elements can be configured such that they form a housing at least partially surrounding the demultiplexer module, which protects the carrier plate, the focussing member and the further optical elements from external environmental influences.

In a further embodiment, the connection element is a bent part, wherein the first limb element and the ground element in each case have a U-shaped recess. The sections remaining between the U-limbs of each recess form the first and the second spring element. This is one option for configuring the spring elements integrally with the connection element. Further embodiments with spring elements configured integrally with the connection element are, however, also conceivable independent of this special embodiment.

The bent part can for example be manufactured by punching, etching or laser cutting.

The special U-shaped embodiment impresses, on the one hand, due to its simplicity in the form and manufacture. In addition, the connection element delivers good protection against external environmental influences through the integral design of the spring elements since the limb elements/fastening spring elements have only proportionally small recesses such that dust can hardly penetrate into the space at least partially surrounded by the connection element.

In a particularly preferred embodiment, the fastening elements of the limb elements are either projections, which are configured such that they can be inserted into corresponding depressions provided in a detector plate or recesses, which are configured such that corresponding projections arranged on a detector plate can be inserted into them. Such a design of the fastening elements allows a simple adhesive interconnection between demultiplexer module and detector plate. The projections or depressions are generally also coated with adhesive, shortly before they are connected to a corresponding element. As a result, a first rough adjustment of the components is enabled and the stability of the component connections increased.

The optical waveguide can generally be configured as fibre optic cable in the case of all embodiments. In addition, a ferrule interface can be arranged on the carrier plate and on the end of the waveguide opposed to the signal output, via which interface the fibre optic cable is connectable with a further optical waveguide/fibre optic cable to further transmit the optical signal. The ferrule interface allows two interfaces to be arranged directly on the carrier plate via which interfaces the fibre optic cable can be connected to a multiplex signal source on one side (via the ferrule interface) and to a detector plate on the other side (for example via the connection element). As a result, a particularly compact and stable form of the demultiplexer module results.

The present invention also comprises a demultiplexer, which consists of a demultiplexer module and a detector plate according to the invention. In this case, the detector plate comprises at least one circuit board and detectors arranged on the circuit board (receiver elements). In this case, demultiplexer module and detector plate can be produced by different manufacturers, but assembled prior to delivery to the user by one of the two manufacturers or a third party. Owing to the previously mentioned positive properties of the demultiplexer module in relation to stability and adjustment, the assembly of the two components is simple and cost-effective.

Further advantages, features and application possibilities of the present invention will be clear from the following description of preferred embodiments and the associated figures, wherein.

Figure 1:
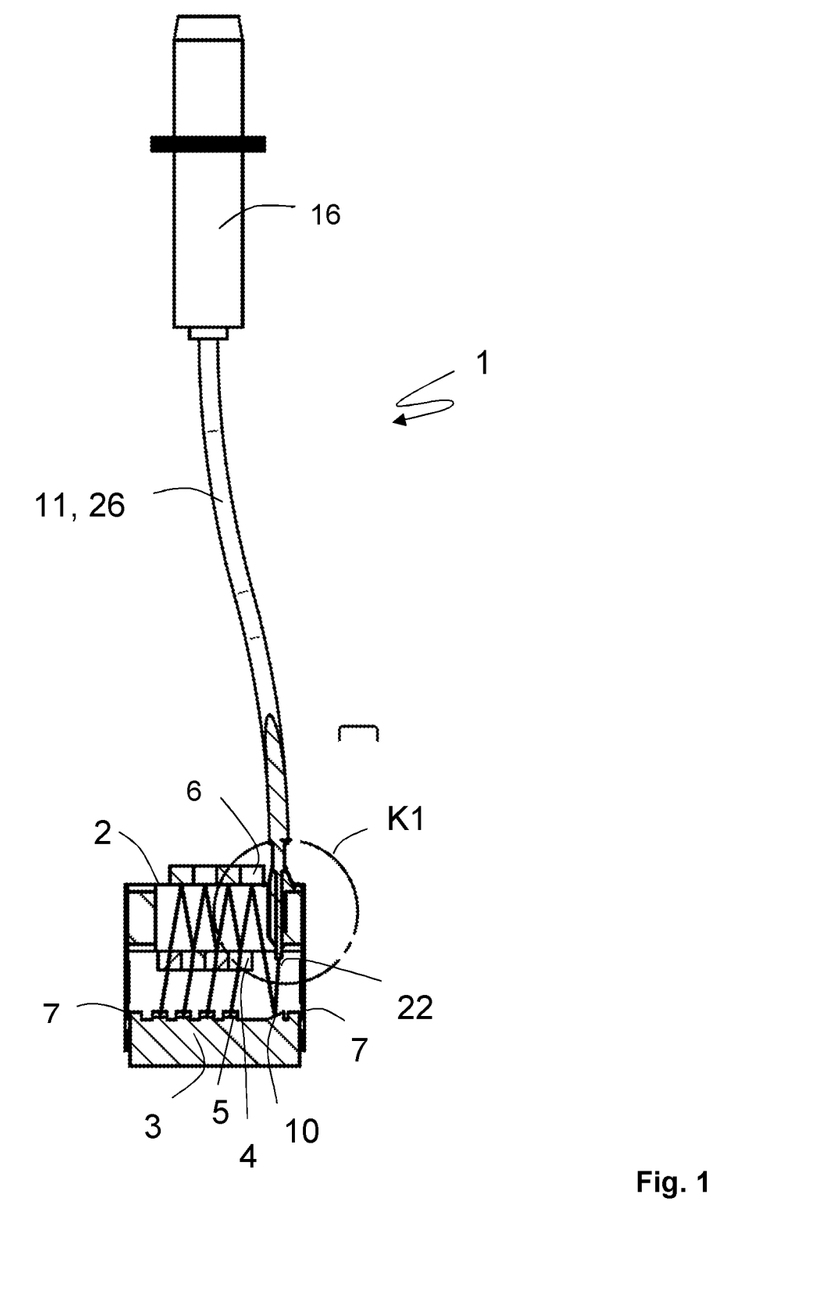
FIG. 1: shows a sectional view of the demultiplexer module according to the invention.
Figure 2:
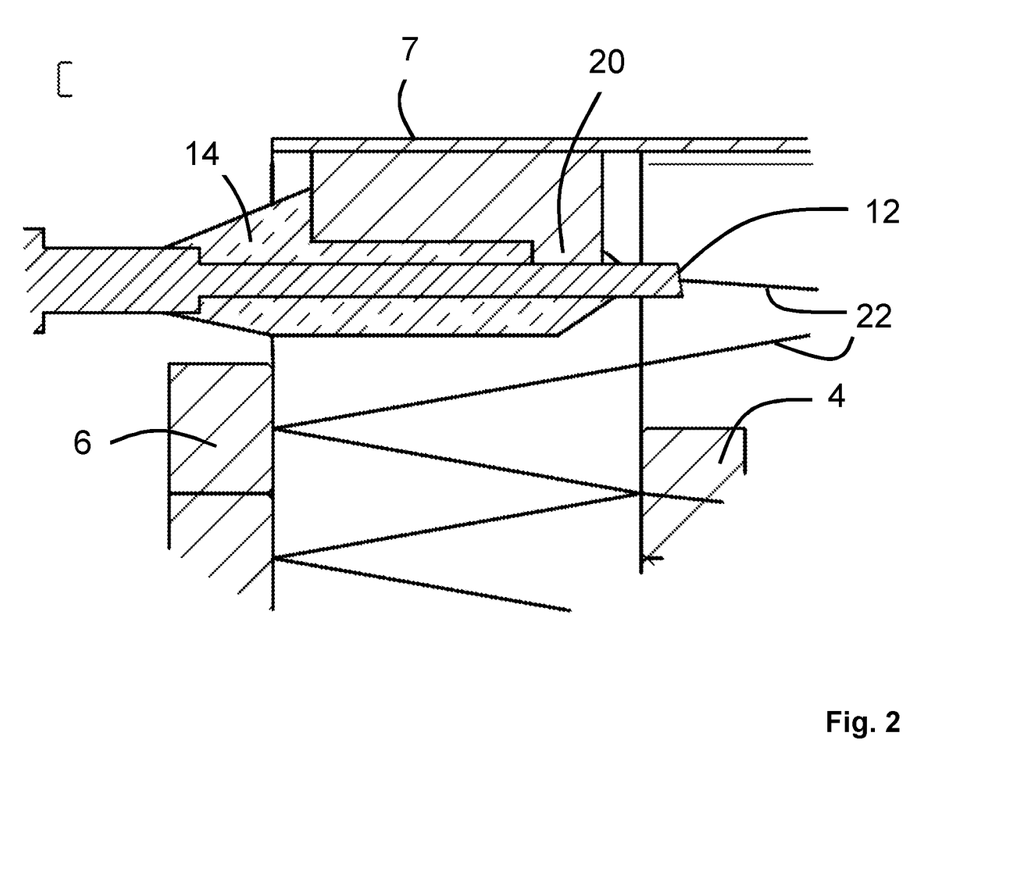
FIG. 2: shows an enlarged view of the demultiplexer according to the invention shown in FIG. 1 with a focus on the stop.

A sectional view of the demultiplexer module 1 can be seen in FIGS. 1 and 2, in the case of which the cutting plane is selected such that the beam path 22 is in the cutting plane. In this case, FIG. 2 shows the section from FIG. 1 marked by the circle K1.

The beam path 22 is described below by way of example for the case of a demultiplexer. However, a multiplexer has an identical construction and differs only in the direction of the beam path 22. In the case of a demultiplexer, the beam path 22 runs in FIG. 1 and FIG. 2 proceeding from the signal output 12 in the direction of the moulded part 3. If the beam path 22 is reversed, this constitutes the case of a multiplexer.

In the representation shown in FIGS. 1 and 2, an optical multiplex signal enters via a ferrule interface 16 into the fibre optic cable 11 surrounded in parts by a coating 26, such as e.g. a glass with lower refractive index or a plastic and therefore into the demultiplexer module 1. The fibre optic cable 11 has a signal output 12 and is fastened to the carrier plate 2 by being firmly adhered using an adhesive 14 to a fibre stop 20 and on the side of the carrier plate 2 facing the signal output 12. The adhesive 14 absorbs forces which would otherwise be diverted directly to the fibre optic cable fastened to the fibre stop 20 in the case of movements of the ferrule interface. A curved reflecting surface 10 is arranged opposite the signal output 12, said surface being configured integrally with the moulded part 3 such that an optical signal leaving the signal output 12 impinges upon the curved reflecting surface 10 as the first signal. The light bundle leaving the signal output 12 initially consists of divergent light beams (discernible in FIG. 3). It then impinges on the side opposite the signal output on the curved surface 10 and is reflected back at an angle α in the direction of the carrier plate and converted into a parallel light bundle. The curved surface 10 is therefore configured as collimation optics.

The parallel light bundle subsequently impinges on the side of the carrier plate 2 facing away from the moulded part 3 on a reflecting element 6, which deflects the light bundle on a wavelength-selective element 4 arranged on the side of the carrier plate 2 facing the moulded part 3. This wavelength-selective element 4 transmits a portion of the light bundle in a wavelength range, which corresponds to a single transmission channel of the multiplex signal, and reflects the portion of the light bundle in the remaining range of the entire wavelength spectrum. The transmitted light bundle therefore still has only one transmission channel and subsequently impinges on a focussing element 5 located on the moulded part 3 which is provided to focus the incident light bundle on a focal point 21 (discernible in FIG. 3). The light bundle reflected on the wavelength-selective element then in turn impinges on a reflecting element 6 on the side of the carrier plate 2 facing away from the moulded part 3. From there, the light bundle is reflected back in the direction of the moulded part 3 such that it impinges on a further wavelength-selective element 4, which allows another portion of the signal to be transmitted and reflects the remaining signal. From there, the described beam path is repeated until all transmission channels have been split by the former multiplex signal. The demultiplexer module 1 is in this case dimensioned such that the respective focal points 21 correspond with the centres of the detectors 17 in the case of a determined temperature (e.g. 25° C.), which are located on the detector plate 18, to which the demultiplexer module 1 is supposed to be connected (discernible in FIG. 3).

Figure 3:
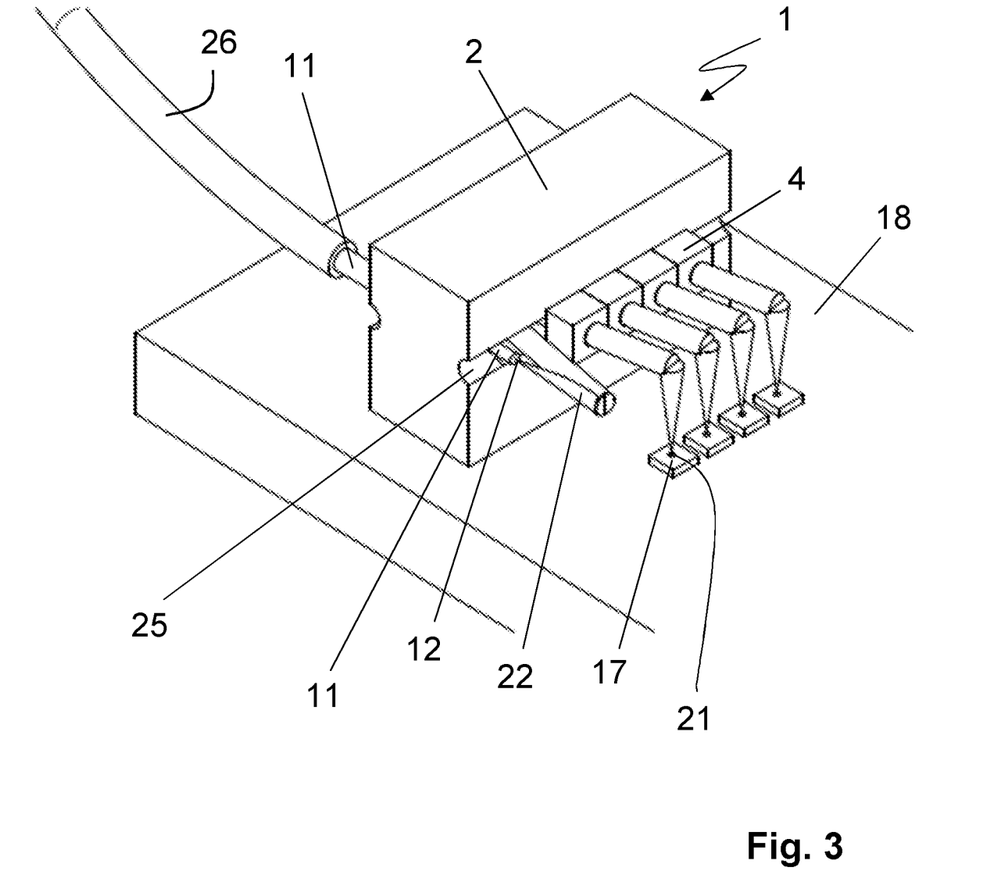
FIG. 3: shows a perspective view of the demultiplexer module according to the invention (without focussing member and connection element) connected to a detector plate.

FIG. 3 shows a perspective view of certain parts of the demultiplexer module 1 in a state connected to a detector plate 18. Just as in FIGS. 1 and 2, it can be discerned using this representation that the four wavelength-selective elements 4 are arranged along a longitudinal axis. The four reflecting elements 6 not visible in this representation and the four focussing elements 5 are also arranged along longitudinal axes running parallel thereto. In a plane perpendicular to these longitudinal axes, the carrier plate 2 has a cross-sectional area, which is comparable to the cross-sectional area of an anvil. The outlet opening 13 is provided as a space for the beam path 22, said outlet opening is arranged centrally in the carrier plate 2. The cross-sectional area of the carrier plate 2 resembling an anvil results from the U-shaped adhesive stop grooves 25 arranged on the two open sides of the outlet opening 13. The fibre optic cable 11 is connected to the carrier plate 2 on the side of the carrier plate facing the observer at a side wall of the outlet opening 13. Moreover, the wavelength-selective elements 4 can be discerned on the carrier plate 2 on the side facing the observer. Furthermore, the beam path 22 is also shown in this representation, wherein the focussing elements 5 located on the moulded part 3 (which are not shown in this representation) convert the incident light bundle from parallel running light beams into light bundles of light beams such that they converge in each case in a determined focal point 21. In this case, an ideal state is shown in which the centre of a detector 17 corresponds to the respective focal point 21 of a focussing element 5 assigned to the detector 17. The detectors 17 are located, as shown here, on the detector plate 18, which is connected to the demultiplexer module 1 via a connection element 7 not shown in this representation.

Figure 4:
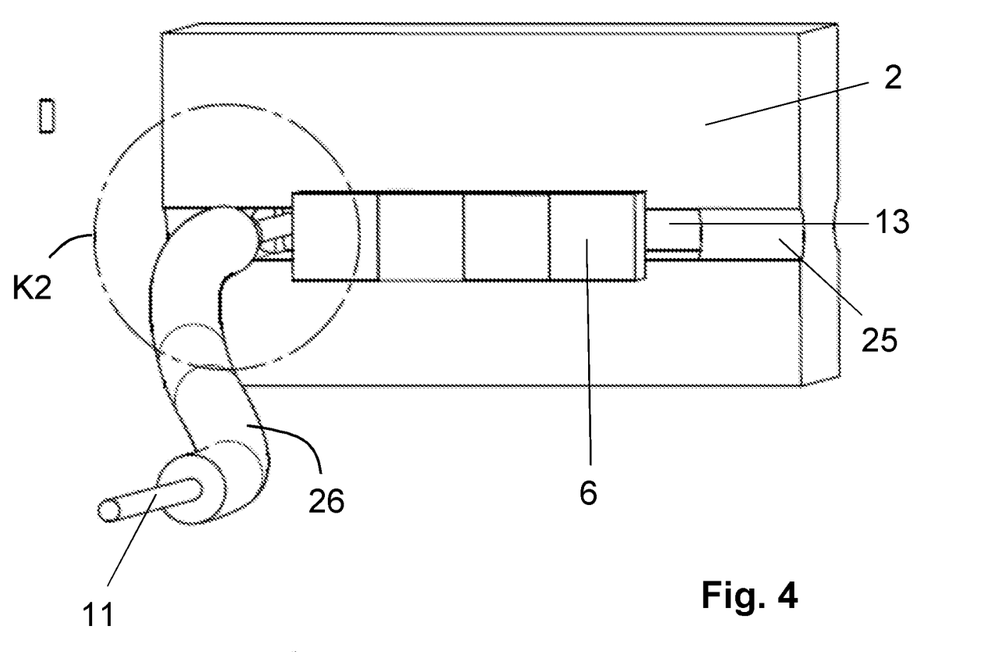
FIG. 4: shows a perspective view of a carrier plate according to the invention with waveguide.
Figure 5:
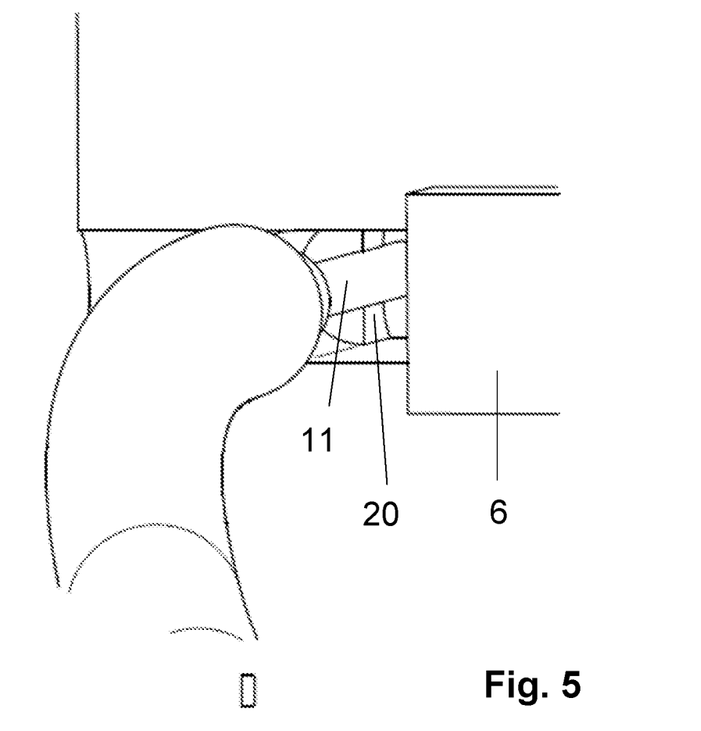
FIG. 5: shows an enlarged view of the carrier plate shown in FIG. 4 with a focus on the stop.

FIGS. 4 and 5 show a perspective view of the side of the carrier plate 2 facing the moulded part 3. In this case, FIG. 5 shows the section from FIG. 4 marked by the circle K2. In this representation, the outlet opening 13 can in particular be discerned, within which a part of the beam path 22 of the filter cascade spreads out. The outlet opening 13 has a fibre stop 20 on the left side when viewed by the observer, which is configured as a U-shaped groove. The fibre optic cable 11 surrounded in parts by a coating 26 is fastened to the fibre stop 20 by means of an adhesive 14 such that the signal output 12 lying on the side facing away from the observer is adjusted precisely with respect to the moulded part 3. Furthermore, the reflecting elements 6 can also be seen in this representation which are fastened to the support surfaces of the carrier plate 2.

Figure 6:
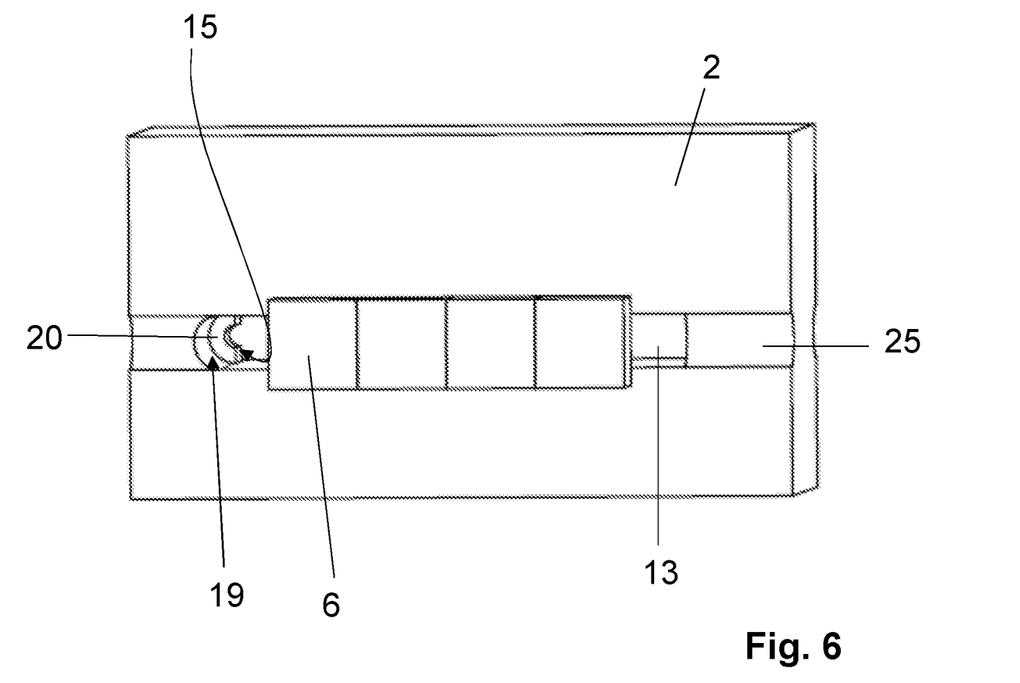
FIG. 6: shows a perspective view of the carrier plate shown in FIG. 4 without representation of the waveguide.

FIG. 6 shows the carrier plate 2 according to the invention represented in FIGS. 4 and 5 without waveguide 11. The construction of the groove, arranged in the outlet opening 13, with a first groove section 15 and a second groove section 19 can be discerned particularly easily here. The first groove section 15 is configured as a stop and has a smaller cross-sectional area than the second groove section 19.

Figure 7:
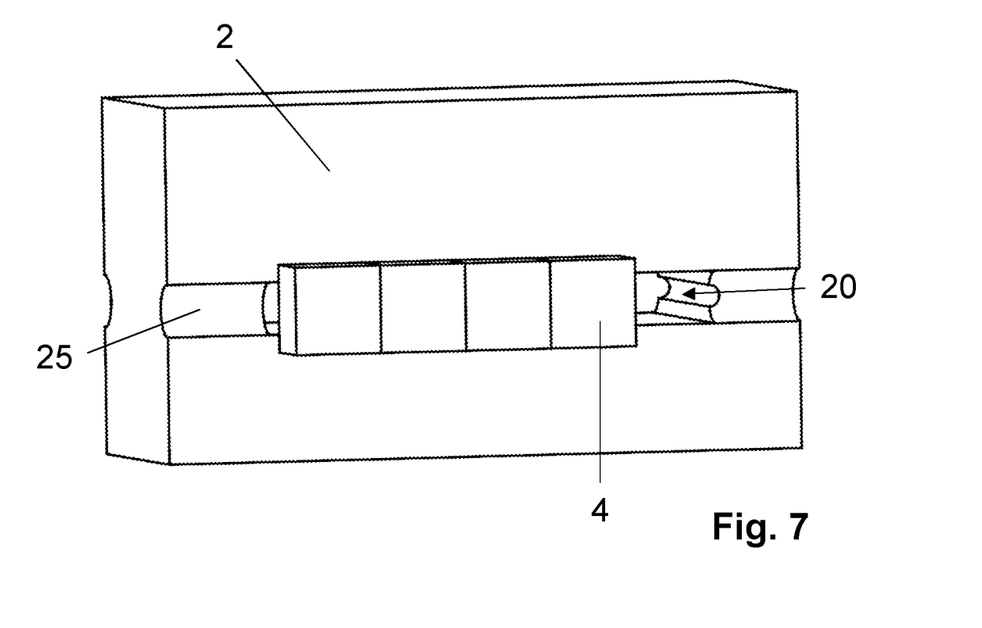
FIG. 7: shows a perspective view of a further carrier plate according to the invention.

A carrier plate with an alternatively configured groove is shown in FIG. 7, which is configured in a U-shape or continuously as a stop 20. This groove, in contrast to the groove shown in FIG. 6, does not have different sections. In FIG. 7, the side of the carrier plate 2 facing the moulded part 3 is shown, on which the wavelength-selective elements 4 are fastened.

Figure 8:
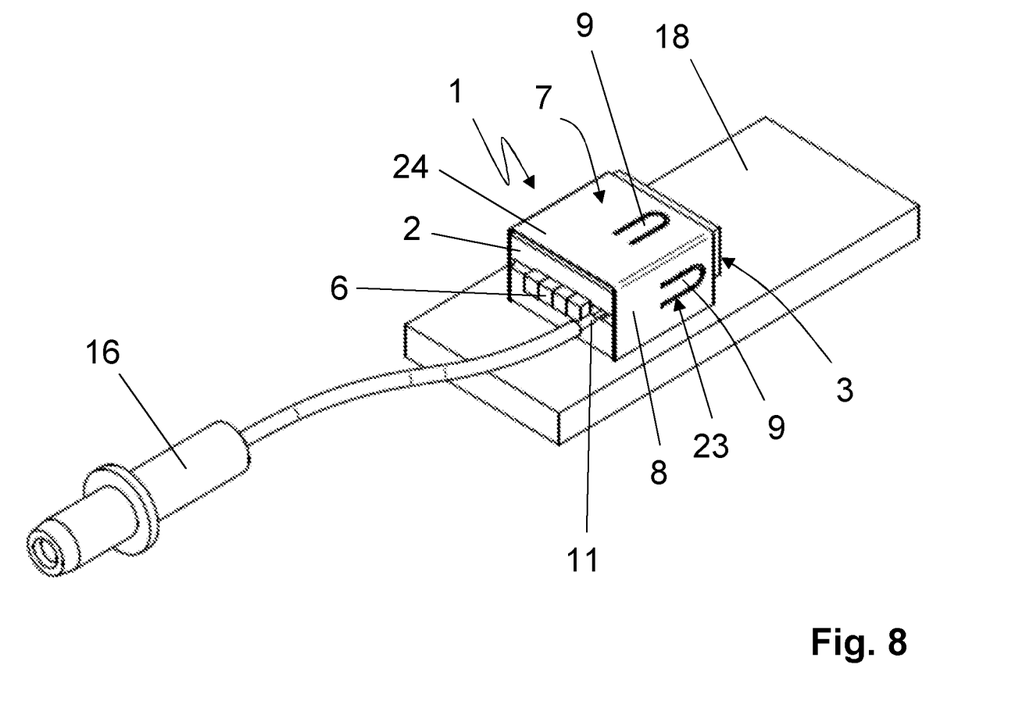
FIG. 8: shows a perspective view of the demultiplexer module according to the invention including ferrule interface and connected to a detector plate.

FIG. 8 shows a perspective view of an embodiment of the complete demultiplexer module 1 connected to a detector plate 18. In this representation, the connection element 7 can in particular be discerned, which encloses the majority of the remaining components of the demultiplexer module 1 in three spatial directions and therefore assumes a housing function.

The carrier plate 2 and the moulded part 3 are connected to one another via the connection element 7. In this case, the spring elements 9 establish a direct connection between carrier plate 2 and moulded part 3. The limb element/fastening spring element 8 also belonging to the connection element 7 is, in contrast, provided to connect the demultiplexer module 1 to the detector plate 18.

The connection element 7 shown here has a U-shape, wherein the two limb elements 8 of the U-shape are configured as fastening spring elements and accordingly mount the carrier plate 2 and the moulded part 3 anisotropically elastically with respect to the detector plate 18. A spring element 9 can be discerned inside the limb element 8, which is located on the side facing the observer, said spring element being configured integrally with the connection element 7 or the limb element 8 by a U-shaped recess 23. A further spring is located inside the floor element 24, which connects the two limb elements 8 to one another. The two spring elements 9 provide an anisotropic, elastic mounting of the moulded part 3 with respect to the carrier plate 2. The fixed point (pivot point) of the moulded part can be set through the arrangement of these two spring elements 9. FIG. 8 also shows a ferrule interface 16 on one end of the fibre optic cable 11 facing the demultiplexer module, via which an optical signal can easily be coupled into the demultiplexer module 1.

LIST OF REFERENCE NUMERALS

1 Demultiplexer module
2 Carrier plate
3 Focussing member (moulded part)
4 Wavelength-selective element (passive filter)
5 Focussing element
6 Reflecting element
7 Connection element
8 Limb element/fastening spring element
9 Spring element
10 Curved reflecting surfaces
11 Waveguide (fibre optic cable)
12 Signal output
13 Outlet opening
14 Adhesive
15 First groove section
16 Ferrule interface
17 Detector 18 Detector plate
19 Second groove section
20 Fibre stop
21 Focal point
22 Beam path
23 U-shaped recess
24 Floor element
25 Adhesive stop groove
26 Coating (of the waveguide)

The invention claimed is:

1. Multiplexer or demultiplexer module, comprising:
a carrier plate with at least one wavelength-selective element;
at least two focussing elements; and
a waveguide, which has a signal output or input for coupling a signal in or out and collimation optics, which are arranged between the signal output and a first wavelength-selective element,
wherein the carrier plate has a stop for the waveguide, and
wherein the waveguide or a coating surrounding the waveguide rests on or is fastened to the stop.

2. Multiplexer or demultiplexer module according to claim 1, wherein a focussing member is provided, which has the at least two focussing elements.

3. Multiplexer or demultiplexer module according to claim 1, wherein the stop is configured as a groove, in which the waveguide or the coating surrounding the waveguide is arranged.

4. Multiplexer or demultiplexer module according to claim 3, wherein the groove has at least two groove sections with different groove cross-sections, wherein a first groove section is configured as the stop, and wherein a second groove section has a larger cross-sectional area than the first groove section.

5. Multiplexer or demultiplexer module according to claim 3, wherein the groove is V-shaped or U-shaped.

6. Multiplexer or demultiplexer module according to claim 1, wherein the carrier plate has two support surfaces arranged parallel to one another, and wherein the at least one wavelength-selective element is arranged on one support surface and at least one reflecting element or an additional wavelength-selective element is arranged on the other support surface and the carrier plate has an outlet opening extending between both support surfaces.

7. Multiplexer or demultiplexer module according to claim 6, wherein the carrier plate has at least one additional groove, which is configured such that an open end of the outlet opening is arranged inside the groove.

8. Multiplexer or demultiplexer module according to claim 7, wherein the groove is V-shaped or U-shaped.

9. Multiplexer or demultiplexer module according to claim 6, wherein the stop is arranged on an inner wall of the carrier plate.

10. Multiplexer or demultiplexer module according to claim 1, wherein the stop is arranged on an outer wall of the carrier plate.

11. Multiplexer or demultiplexer module according to claim 1, wherein the at least one focussing member is configured as a moulded part and has the collimation optics,
wherein the collimation optics are configured as a curved reflecting surface and the moulded part and the carrier plate are connected to one another via a connection element,
wherein the connection element has at least two spring elements, which establish an anisotropic elastic connection between the carrier plate and the moulded part,
wherein the two spring elements in each case have, in two directions perpendicular to one another, spring constants at least twice as large than in a third spatial direction, perpendicular to the first two directions, of the elasticity direction, and
wherein the two spring elements have elasticity directions running parallel to one another, which span a first elasticity plane.

12. Multiplexer or demultiplexer module according to claim 11, wherein the at least two focussing elements are configured as curved reflecting surfaces, the moulded part has a longitudinal axis, along which the at least two focussing elements and the collimation optics are arranged, and the connection element mounts the focussing member with respect to the carrier plate such that the spring elements have contact surfaces, on which the moulded part is fastened, and imaginary straight lines, which run proceeding from middle points of the contact surfaces of the at least two spring elements in each case along the respective elasticity direction of the at least two spring elements, intersect substantially in an intersection point, which is arranged inside the moulded part.

13. Multiplexer or demultiplexer module according to claim 12, wherein the at least two focussing elements are configured integrally with the moulded part.

14. Multiplexer or demultiplexer module according to claim 12, wherein the at least two spring elements are arranged such that the intersection point is located in relation to the longitudinal axis of the moulded part between a position of the collimation optics and a middle of a section of the longitudinal axis, which is delimited by the collimation optics and the focussing elements spaced furthest apart from the collimation optics.

15. Multiplexer or demultiplexer module according to claim 11, wherein the connection element has a base part connected to the carrier plate,
wherein the base part has a floor element, to which the first spring element is fastened, and a first limb element, to which the second spring element is fastened,
wherein the first limb element has at least one fastening element for fastening the carrier plate on a transmitter or detector plate, and
wherein the base part has a second limb element, which is fastened to the floor element.

16. Multiplexer or demultiplexer module according to claim 15, wherein the first and the second limb elements are configured as fastening spring elements, which in each case have, in two spatial directions perpendicular to one another, spring constants twice as large than in a third spatial direction perpendicular to the two first spatial directions, of the elasticity direction, and
wherein the elasticity direction of the first fastening spring element and the elasticity direction of the second fastening spring element do not run parallel to one another and determine a second elasticity plane, which is arranged at right angles to the first elasticity plane.

17. Multiplexer or demultiplexer module according to claim 15, wherein the connection element is a bent part, and wherein the first limb element and the floor element in each case have a U-shaped recess such that the sections remaining between the U-limbs of each recess form the first spring element and second spring element.

18. Multiplexer or demultiplexer module according to claim 15, wherein the at least one fastening element is a projection, which is configured such that it can be inserted into a corresponding depression provided in a detector or transmitter plate or is a depression, which is configured such that a corresponding projection arranged on a detector or transmitter plate can be inserted into it.

19. Multiplexer or demultiplexer module according to claim 11, wherein collimation optics are configured integrally with the moulded part.

20. Multiplexer or demultiplexer consisting of a multiplexer or demultiplexer module according to claim 1 and a transmitter or detector plate, wherein the transmitter plate includes a circuit board and transmitter elements arranged on the circuit board and a detector plate includes a circuit board and receiver elements arranged on the circuit board.

21. Multiplexer or demultiplexer module according to claim 1, wherein the signal is an optical signal and wherein the waveguide is a fibre optic cable for the transmission of the optical signal.

22. Multiplexer or demultiplexer module according to claim 1, wherein the stop is configured integrally with the carrier plate.

* * * * *